R. T. WINGO.
MOTION CONVERTING DEVICE.
APPLICATION FILED OCT. 18, 1913.
1,112,747.
Patented Oct. 6, 1914.
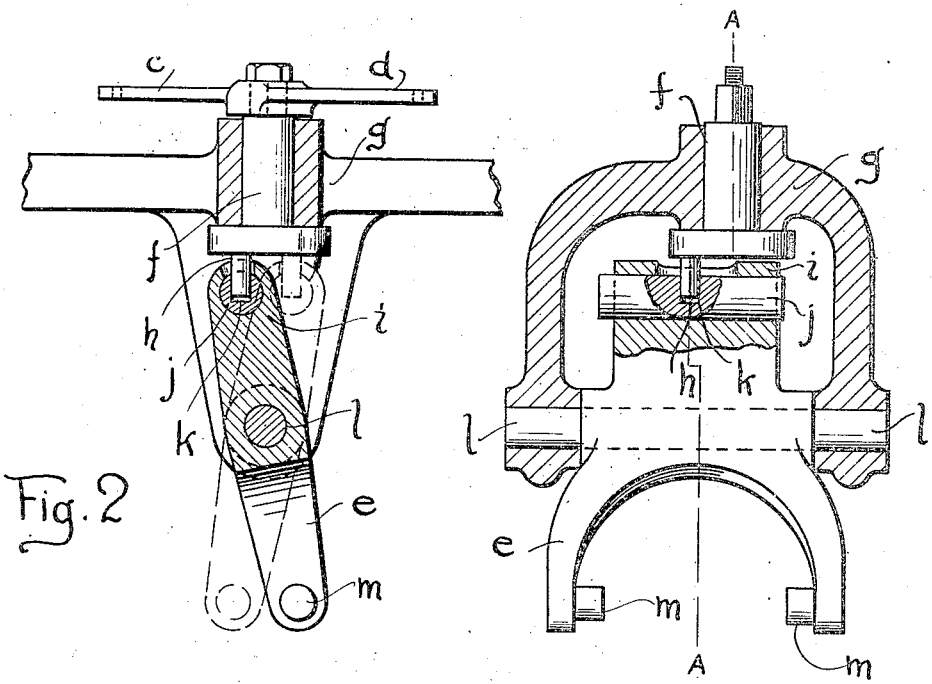
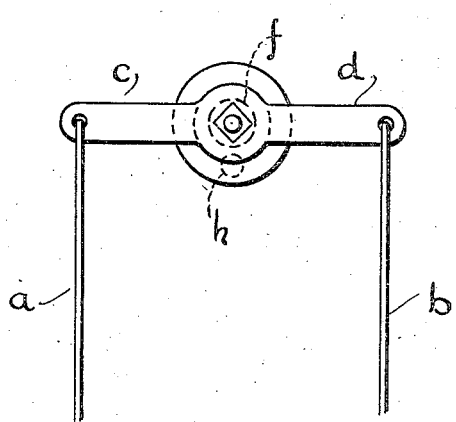
WITNESSES
INVENTOR
Richard T. Wingo
BY
Ralgemound A. Parker.
ATTORNEY

UNITED STATES PATENT OFFICE.

RICHARD T. WINGO, OF DETROIT, MICHIGAN, ASSIGNOR, BY MESNE ASSIGNMENTS, TO DETROIT TRACTOR COMPANY, OF LA FAYETTE, INDIANA, A CORPORATION OF INDIANA.

MOTION-CONVERTING DEVICE.

1,112,747.    Specification of Letters Patent.    Patented Oct. 6, 1914.

Application filed October 18, 1913. Serial No. 795,815.

*To all whom it may concern:*

Be it known that I, RICHARD T. WINGO, citizen of the United States, residing at Detroit, county of Wayne, State of Michigan, have invented a certain new and useful Improvement in Motion-Converting Devices, and declare the following to be a full, clear, and exact description of the same, such as will enable others skilled in the art to which it pertains to make and use the same, reference being had to the accompanying drawings, which form a part of this specification.

This invention relates to motion-converting devices and especially to devices for converting a part-rotative movement into oscillation of a fork for shifting a clutch or gears.

In the drawings Figure 1 is an elevation partly in section of the fork, the motion-converting device and the support. Fig. 2 is a section on the line A—A of Fig. 1, the rotating members being shown in elevation and a pair of crank arms being added. Fig. 3 is a top view of the crank arms showing reins attached thereto to swing the crank arms.

The device hereinafter described is intended more particularly for use in connection with a tractor to effect the steering by means of reins $a$ and $b$, shown in Fig. 3. The motion-converting device is intended to convert the part-rotative movement of the crank arms $c$ and $d$ into an oscillatory movement of the shifting fork $e$. This operates a clutch, not shown, to throw the power into connection with one or more gears (not shown) to effect the steering. It is apparent, however, that this shifting fork might also be used to shift gears, so I have not illustrated it in connection with any particular kind of shiftable device.

The crank arms $c$ and $d$ are squared onto the spindle $f$ which is journaled in a part of the frame $g$. At the end of the spindle $f$ is an eccentric pin $h$. The head $i$ of the shifting fork $e$ journals a cross-pin $j$ which can move both longitudinally and rotatively. This has a circular hole $k$ in which the pin $h$ may move longitudinally and also rotatively. The shifting fork $e$ has a pair of trunnions $l$ which are journaled in parts of the frame $g$ so that the shifting fork is pivoted near its center. The bifurcated ends of the fork carry studs $m$ which may engage in an annular race on the shiftable member (not shown).

When the spindle $f$ is given a part rotation in either direction, the eccentric pin is caused to describe an arc. This causes the fork $e$ to be swung upon its trunnions. The capability of longitudinal movement in the cross-pin $j$ allows this segmental movement of the eccentric pin. Notwithstanding the fork-head $i$ moves in a single plane. The capability of rotative movement of the pin $j$ in relation to the head $i$ allows the fork to rotate in a plane perpendicular to the plane in which the eccentric pin $h$ revolves, and the eccentric pin $h$, being capable of movement in relation to the cross-pin $j$, allows the head $i$ to approach and draw away from the enlarged pin-carrying portion of the spindle $f$.

What I claim is:

1. A motion-converting device, having in combination an oscillatory member, a member capable of part rotation, a sliding and rotating cross-pin in the oscillatory member and an eccentric pin on the member capable of part-rotative movement, and having a rotative and sliding engagement with the sliding and rotating cross-pin, substantially as described.

2. A motion-converting device, having in combination a pair of members journaled to have pivotal movements in perpendicular planes, a sliding and rotating cross-pin carried in one member and an eccentric pin carried on the other member capable of sliding and rotative movement in the cross-pin, substantially as described.

3. The combination with a shifting fork, supported to swing and provided with a head, of a cross-pin journaled to rotate and move longitudinally in said head, a spindle supported to have a part-rotative movement in a plane substantially perpendicular to the plane of the swinging movement of the shifting fork and an eccentric pin on the said spindle having a rotative and a sliding connection with the said rotating and sliding cross-pin, substantially as described.

In testimony whereof, I sign this specification in the presence of two witnesses.

RICHARD T. WINGO.

Witnesses:
  STUART C. BARNES,
  MARIETTA E. RUDD.